United States Patent
Huynh

(10) Patent No.: US 6,573,692 B2
(45) Date of Patent: Jun. 3, 2003

(54) DEVICE FOR REGULATING THE CURRENT PASSING THROUGH AN INDUCTIVE ELEMENT, IN PARTICULAR AN SOLENOID VALVE

(75) Inventor: Tan Duc Huynh, Neuilly S/Marne (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 10/089,239

(22) PCT Filed: Jul. 25, 2001

(86) PCT No.: PCT/FR01/02440

§ 371 (c)(1),
(2), (4) Date: Mar. 28, 2002

(87) PCT Pub. No.: WO02/11272

PCT Pub. Date: Feb. 7, 2002

(65) Prior Publication Data

US 2002/0149349 A1 Oct. 17, 2002

(30) Foreign Application Priority Data

Jul. 28, 2000 (FR) .............................................. 00 09923

(51) Int. Cl.[7] .............................................. G05F 1/613
(52) U.S. Cl. ........................ 323/225; 323/222; 323/284
(58) Field of Search ................................. 323/222, 225, 323/232, 282, 284, 285

(56) References Cited

U.S. PATENT DOCUMENTS

| 4,511,829 A | 4/1985 | Wisniewski ............. 323/287 X |
| 5,627,740 A | 5/1997 | Johari ........................ 318/317 |
| 6,369,561 B1 * | 4/2002 | Pappalardo ................. 323/285 |
| 6,445,165 B1 * | 9/2002 | Malik et al. ................ 323/222 |

* cited by examiner

*Primary Examiner*—Jessica Han
(74) *Attorney, Agent, or Firm*—Liniak, Berenato & White

(57) ABSTRACT

A device for regulating the current passing through an inductive element, including a series branch including said inductive element and a control device (PT) monitored by a control signal (Vc) to supply the inductive element from an electric supply source and a device supplying a measurement signal (Vm) of an average current through the inductive element and including a device for acquiring (D Rs) a signal representing a current through the inductive element and a circuit averaging (T2, Rm, Cm) the signal representing a current, and a regulating device for generating the control signal based on a setpoint value and a measurement signal. The acquisition device is arranged parallel to the inductive element.

3 Claims, 2 Drawing Sheets

DEVICE FOR REGULATING THE CURRENT PASSING THROUGH AN INDUCTIVE ELEMENT, IN PARTICULAR AN SOLENOID VALVE

The invention relates to a device for regulating the current passing through a self-inductive element, for example a control solenoid of an electromagnetic valve, and including a series branch featuring the said self-inductive element and a control device driven by a control signal so as to supply the self-inductive element from an electrical power-supply source, especially a voltage source, as well as a measuring device supplying a signal for measuring an average current through the self-inductive element, as well as a regulating device for generating the control signal as a function of a datum value and of the measurement signal.

In the regulating devices of known type, the current which passes through the solenoid is determined on the basis of a low-value resistor or shunt inserted in series with the solenoid. The voltage developed by this shunt is then amplified and averaged in a differential amplifier.

Such a device exhibits several drawbacks.

A first drawback is a voltage drop in the control circuit.

A second drawback is that, with the potential difference present at the terminals of the shunt necessarily having to be small, it has to be amplified, and the presence of the amplifier induces an inaccuracy due to the various bias resistors and to the tolerances inherent in integrated circuits.

The U.S. Pat. No. 4,511,829 proposes to take the measurement by the use of a resistor in series with a diode in reverse mode, in parallel with the self-inductive element.

The object of the present invention is to enhance the abovementioned device.

To that end, the invention relates to a device for regulating the current passing through a self-inductive element, including a series branch including the said self-inductive element and a control device driven by a control signal so as to power the self-inductive element from an electrical power-supply source, as well as a measuring device supplying a signal for measuring a current through the self-inductive element and including a device for acquisition of a signal representative of a current through the self-inductive element and a regulating device for generating the control signal as a function of a datum value and of the measurement signal, the acquisition device including, in parallel with the self-inductive element (S), a branch including, in series, a first resistive element (Rs) and a diode (D), the diode (D) being in reverse mode when the control device (PT) is in a state in which the self-inductive element (S) is coupled to the said power-supply source, characterized in that it includes a circuit for averaging the said signal representative of a current in order to produce a signal representative of the average current in the self-inductive element, and in that the averaging circuit includes a transistor ($T_2$) the gate electrode of which receives a switching signal in order to switch the said transistor in opposition with the said control device (PT), the drain electrode of which receives a signal representative of the voltage at the terminals of the said first resistive element ($R_s$), and the source electrode of which, which constitutes an output of a signal ($V_m$) representative of the said average current ($I_m$), is connected to a capacitive element ($C_m$) in parallel with a second resistive element ($R_m$).

The averaging circuit may also include a transistor, the gate electrode of which receives a switching signal in order to switch over the said transistor in opposition with the said control device, the drain electrode of which receives a signal representative of the voltage at the terminals of the said first resistive element, and the source electrode of which, which constitutes an output for a signal representative of the said average current, is connected to a capacitive element in parallel with a second resistive element.

The drain electrode of the transistor may be connected to the common terminal between the first resistor and the diode via a divider bridge. This divider bridge may have a first end connected to the said common terminal, a second end connected to a voltage source, and a midpoint connected to the said drain electrode, the voltage of the said voltage source being chosen in such a way that the voltage at the said midpoint of the divider bridge has a positive or zero value.

Other characteristics and advantages of the invention will become more apparent on reading the description below, given by way of non-limiting examples, in connection with the drawings, in which:

FIG. 1b representing a timing diagram for the signals at the points M, E, P and K of FIG. 1a;

Figure 1A:
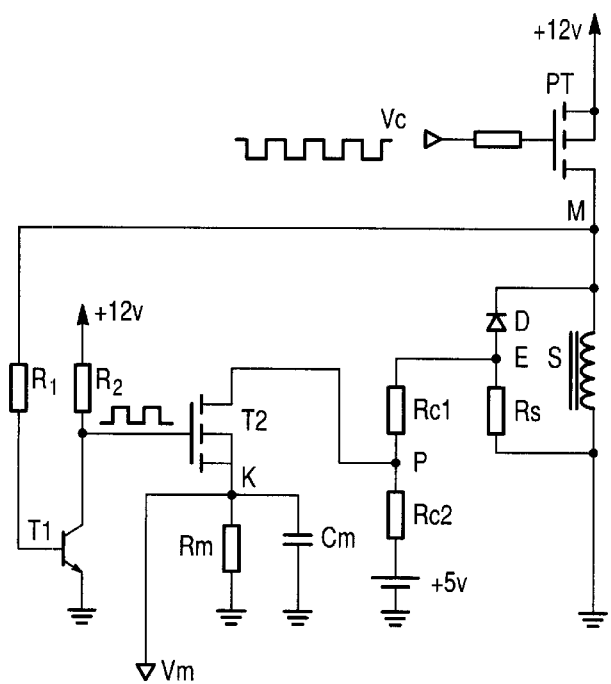
FIG. 1a represents a preferred embodiment of the first variant.
Figure 1B:
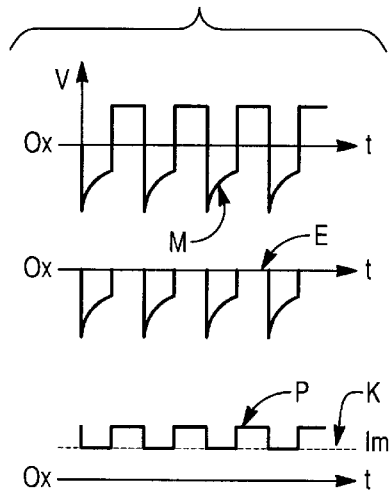

As FIG. 1 shows, a solenoid S, one of the terminals of which is connected to an earth or common-mode pole, is arranged in series with a control device, here an MOS power transistor PT, the source of which is connected to one pole of a power-supply voltage source, for example of 12 V, the other pole of which, at earth potential, is connected to one terminal of the solenoids. The gate electrode of the transistor PT receives a control signal $V_c$ which is a pulse-width modulation (PWM) signal, the duty cycle of which is variable so as to control the value of the average current $I_m$ which passes through the solenoid S. In one application, this solenoid is the control solenoid of an electromagnetic valve, and more particularly a valve for control of the compressor of a motor vehicle. The desired regulation of the average value of the current strength through the solenoid S makes it possible to render the component, compressor or electromagnetic valve, insensitive to the fluctuation of the power-supply voltage, for example of the voltage of the battery of a vehicle, as well as of the internal variation in the properties of the solenoid (resistance and inductance) as a function of temperature.

In parallel with the solenoid S, a resistor $R_s$ is arranged in series with the diode D which is mounted in reverse mode with respect to the power-supply voltage. The voltage picked up at the point E which is common to the resistor $R_s$ and the diode D, is supplied to a divider bridge ($R_{c1}$, $R_{c2}$), one end of which is connected to a power-supply voltage source, for example 5 V, in such a way that the midpoint P which is common to the resistors $R_{c1}$ and $R_{c2}$ always remains at a positive voltage, or at the very least zero voltage (see the timing diagram of FIG. 1b). This common point P is connected to the drain of a field-effect transistor T2 the source of which, which constitutes the output K for the signal $V_m$ representative of average current in the solenoid S, is connected to a resistor $R_m$ and to a capacitor $C_m$ which are wired in parallel. The gate of the transistor T2 is connected to the collector of a bipolar transistor T1 biased by a resistor $R_1$ and the base of which, via a resistor R2, receives a signal picked up at the common point M between the solenoid S and the drain of the transistor PT.

Figure 2A:
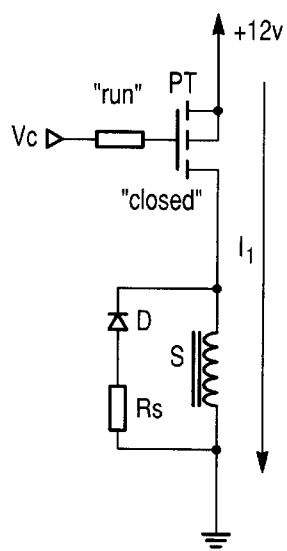
FIGS. 2a and 2b illustrate its operation in the two switched states of the power transistor.

The device functions in the following way. When the voltage $V_c$ is at a level which causes the switch consisting of the transistor PT (FIG. 2a) to close, a current $I_1$ passes through the solenoid S, and only the solenoid, because of the presence of the reverse-mode diode D.

Figure 2B:
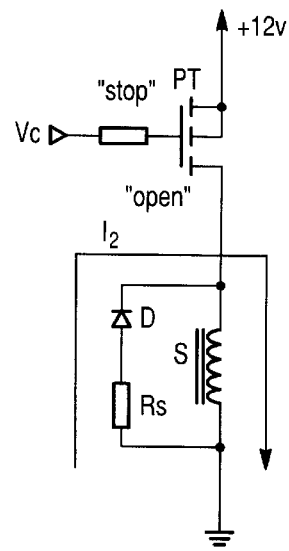

When the voltage $V_c$ is at a level such that the switch consisting of the transistor PT is open (FIG. 2b), the current $I_2$ in the solenoid S now passes through the resistor $R_s$ and the diode D. It is this current which is put to use in the context of the present invention in order to deduce from it the average value of the current which is passing through the solenoid S.

With the layout as described above, the transistor T2 is in the closed state and forwards the voltage to be stored to the capacitor $C_m$, only when the transistor PT is in the open state and when the current $I_2$ flows through the resistor $R_s$. This memory-storage by the capacitor $C_m$ makes it possible then to "reconstruct", at the output K, the average control current $I_m$ in the circuit of the solenoid S, although this current is not "visible" by the said dipole D, $R_s$. This signal $I_m$ is represented in dashed line on the timing diagram of FIG. 1b.

The embodiment described thus makes it possible to pick up the current from the solenoid S by placing one said resistor/diode dipole in parallel, to convert the negative voltage at the two outputs of this dipole into a positive voltage, and finally to replicate the value of the current in the solenoid S by virtue of a sample-and-hold circuit which makes it possible to extract an average value of this current.

This results in the absence of a voltage drop due to the measurement, low tolerances and scarcely increased cost.

The value of the voltage $V_m$ then makes it possible, with the aid of a microprocessor MP, to slave the duty cycle of the current $V_c$ in such a way that the average current $I_m$ through the solenoid S is held at a datum value.

The control of the transistor T2 by the control voltage of the solenoid S via the transistor T1 makes it possible to provide control in opposition between the transistor PT and the transistor T2, that is to say when one is open, the other is in the closed state.

EXAMPLE: the transistor PT is an MOS transistor, with reference BTS611 from the INFINEON Company. The solenoid S exhibits a resistance of 8• and a self-inductance of 50 mH.

D is a 1N4004 diode, $R_s$=10•

Rc1=3.4 k•, Rc2=1 k•

The transistor T2 may be an N-channel MOS transistor of 2N7002 type.

Rm=22 k•, Cm=22•F.

The transistor T1 is an NPN-type transistor with reference BC817.

Figure 3:
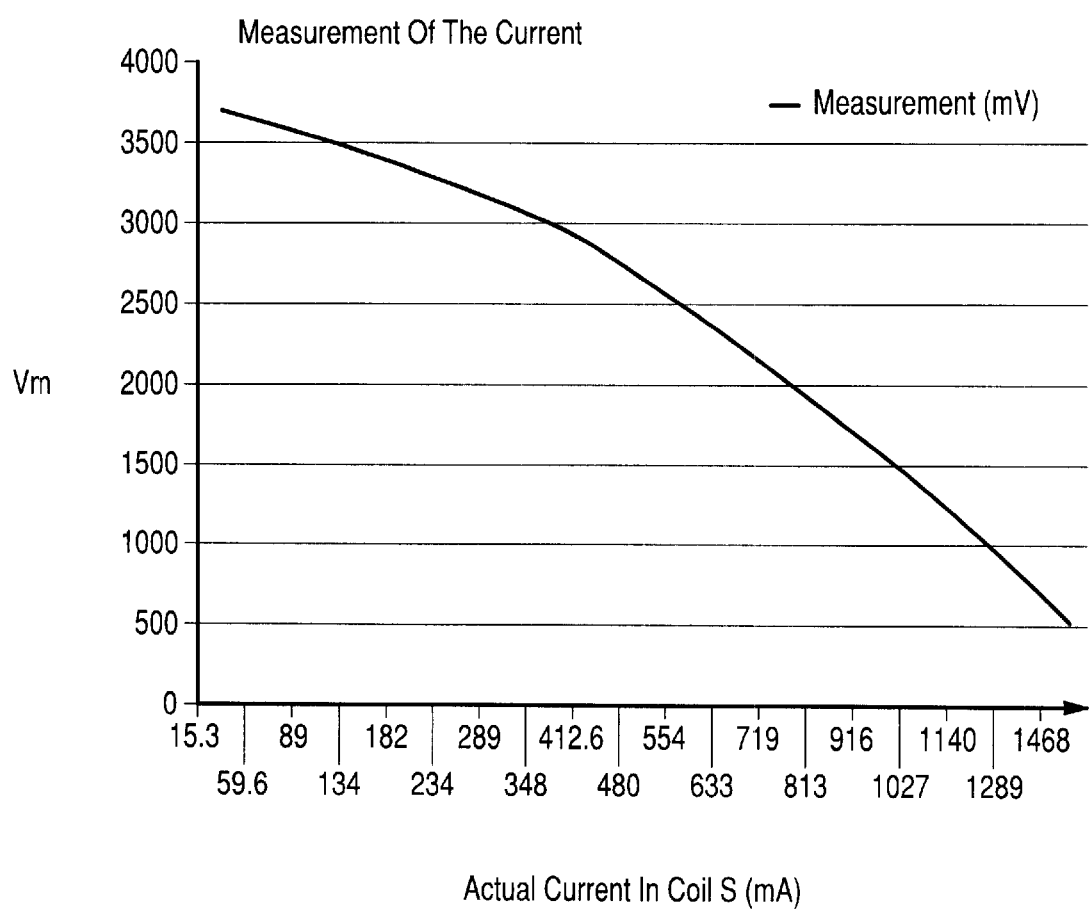
FIG. 3 represents a curve characteristic of the measurement voltage $V_m$ as a function of the average current in the coil S.

FIG. 3, which represents the voltage $V_m$ as a function of the average current $I_m$, shows that this voltage $V_m$ is inversely proportional to the average current $I_m$ developed in the coil. This relationship is linear. In FIG. 3, the curve is not a straight line by reason of the fact that the x-axis scale which has been chosen is not itself linear.

The device described above can then be integrated into a regulation loop, for example, a microprocessor-type motor-vehicle compressor control. The control is regulated in terms of current in order to render the compressor insensitive to the fluctuation in voltage from the battery of the vehicle, as well as to the internal variation of the resistance and of the inductance of the solenoid as a function of temperature.

What is claimed is:

1. Device for regulating current passing through a self-inductive element, including a series branch including said self-inductive element and a control device driven by a control signal so as to power the self-inductive element from an electrical power-supply source, as well as a measuring device supplying a signal for measuring a first current through the self-inductive element and including a device for acquisition of a measurement signal representative of said first current through the self-inductive element and a regulating device for generating the control signal as a function of a datum value and of the measurement signal, the acquisition device including, in parallel with the self-inductive element (S), a branch including, in series, a first resistive element ($R_s$) and a diode (D), the diode (D) being in reverse mode when the control device (PT) is in a state in which the self-inductive element (S) is coupled to said power-supply source, wherein an averaging circuit is provided for averaging said measurement signal representative of said first current in order to produce a signal representative of the average current in the self-inductive element, and wherein the averaging circuit includes a transistor ($T_2$) including a gate electrode that receives a switching signal in order to switch said transistor in opposition with said control device (PT), the drain electrode of said transistor ($T_2$) receives a signal representative of the voltage at the terminals of said first resistive element ($R_s$), and the source electrode of said transistor ($T_2$), which constitutes an output of a signal ($V_m$) representative of said average current ($I_m$), is connected to a capacitive element ($C_m$) in parallel with a second resistive element ($R_m$).

2. Device according to claim 1, wherein the drain electrode of the transistor ($T_2$) is connected to a common terminal (E) between the first resistor ($R_s$) and the diode (D) via a divider bridge ($R_{c1}$, $R_{c2}$).

3. Device according to claim 2, wherein the divider bridge ($R_{c1}$, $R_{c2}$) has a first end connected to said common terminal (B), a second end connected to a voltage source, and a midpoint (P) connected to said drain electrode of the transistor ($T_2$), the voltage of said voltage source being chosen in such a way that the voltage at said midpoint (P) of the divider bridge ($R_{c1}$, $R_{c2}$) has a positive or zero value.

* * * * *